United States Patent [19]

Lardellier

[11] Patent Number: 5,058,379
[45] Date of Patent: Oct. 22, 1991

[54] HIGH BY-PASS RATIO TURBOJET ENGINE WITH COUNTERROTATING UPSTREAM AND DOWNSTREAM FANS

[75] Inventor: Alain M. J. Lardellier, Melun, France

[73] Assignee: Societe Nationale D'Etude et de Construction de Moteurs D'Aviation, Paris, France

[21] Appl. No.: 504,839

[22] Filed: Apr. 5, 1990

[30] Foreign Application Priority Data

Apr. 18, 1989 [FR] France .................................. 8905144

[51] Int. Cl.$^5$ ............................................. F02K 3/077
[52] U.S. Cl. ..................................... 60/226.1; 60/268; 60/39.162
[58] Field of Search ................. 60/226.17, 268, 39.162, 60/262

[56] References Cited

U.S. PATENT DOCUMENTS

| | | | |
|---|---|---|---|
| 3,620,009 | 11/1971 | Wilde ................................. | 60/226.1 |
| 3,938,328 | 2/1976 | Klees . | |
| 4,055,041 | 10/1977 | Adamson et al. ..................... | 244/54 |
| 4,147,029 | 4/1979 | Sangisson ............................. | 244/54 |
| 4,506,850 | 3/1955 | McConnell ........................... | 244/54 |

FOREIGN PATENT DOCUMENTS

| | | |
|---|---|---|
| 1428220 | 7/1969 | Fed. Rep. of Germany . |
| 2398890 | 2/1979 | France . |
| 2172078 | 9/1983 | France . |
| 2622507 | 5/1989 | France . |
| 587528 | 4/1947 | United Kingdom . |
| 588096 | 5/1947 | United Kingdom . |
| 2038948 | 7/1980 | United Kingdom . |
| 2189844 | 11/1987 | United Kingdom ............... 60/226.1 |

Primary Examiner—Louis J. Casaregola
Assistant Examiner—Laleh Jalali
Attorney, Agent, or Firm—Oblon, Spivak, McClelland, Maier & Neustadt

[57] ABSTRACT

A turbojet bypass engine includes an upstream fan of a conventional type and also a downstream fan arranged to rotate in the opposite direction to the upstream fan and driven by a free turbine interleaved with the low pressure turbine which drives the upstream fan. The two fans are supplied by separpate overlapping and inverleaved air flow paths which are formed largely within the nacelle structure of the engine, giving the nacelle an ovoide shape which allows such engines with a high bypass ratio to be mounted below the wings of an aircraft.

9 Claims, 6 Drawing Sheets

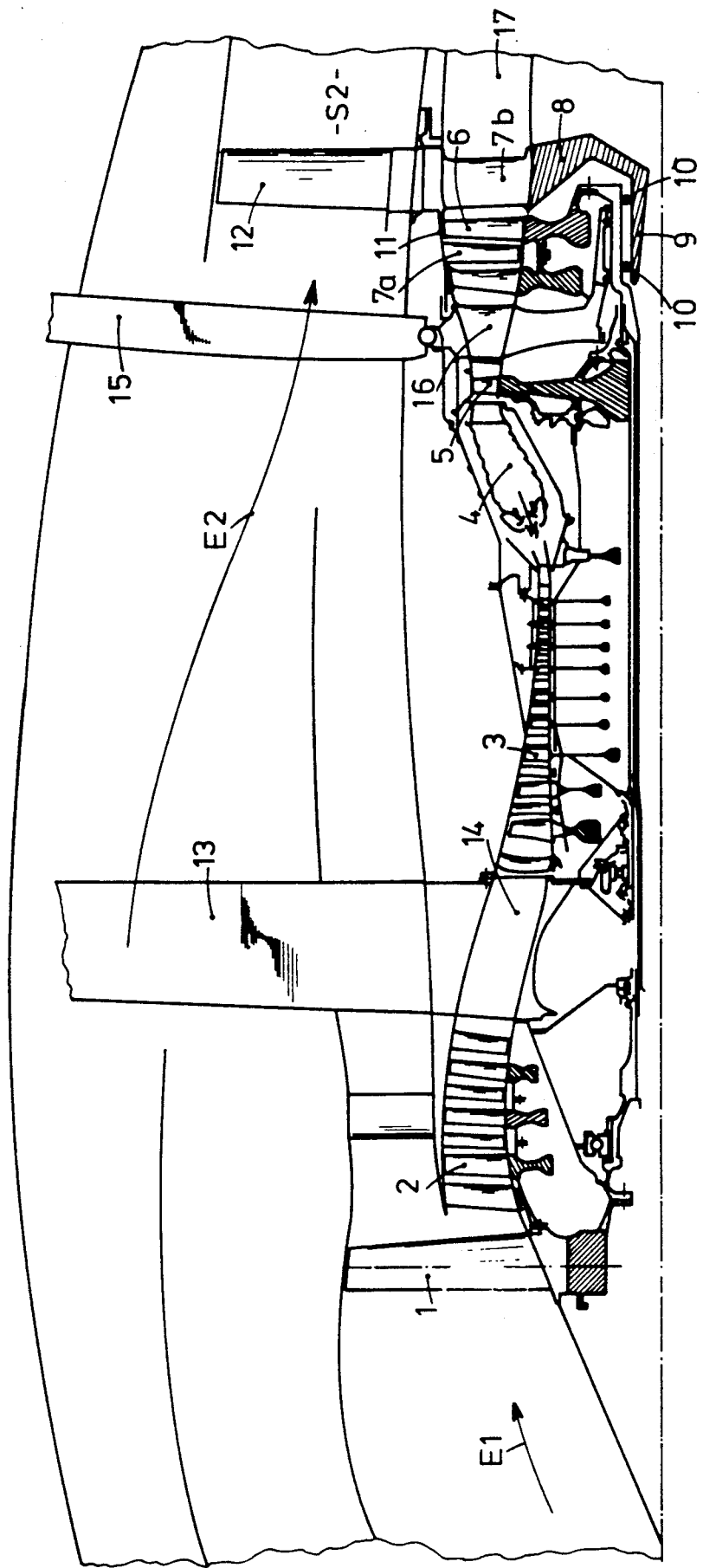

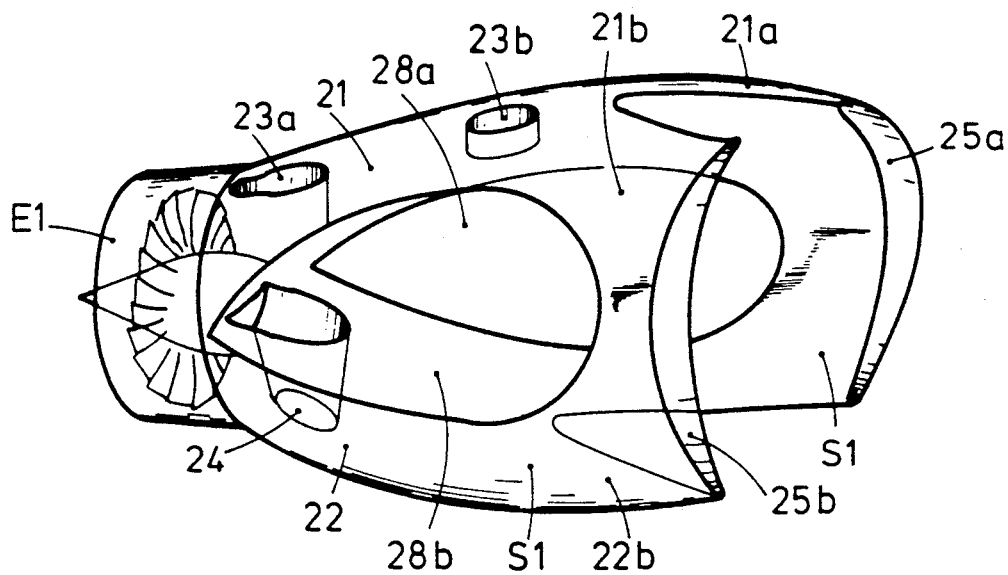
FIG: 2a
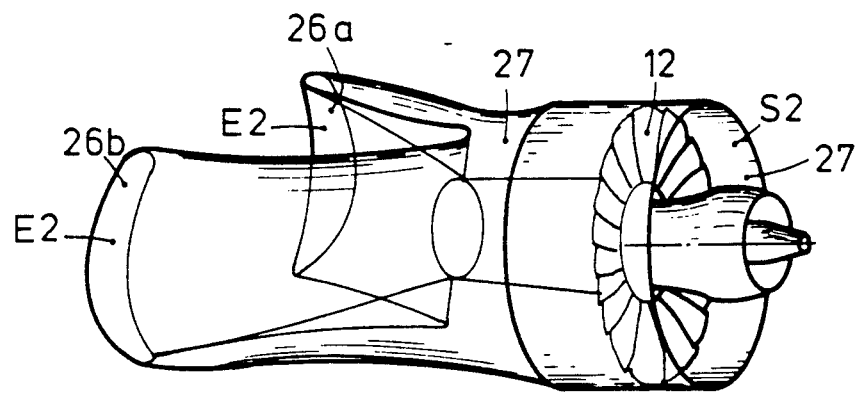
FIG: 2b

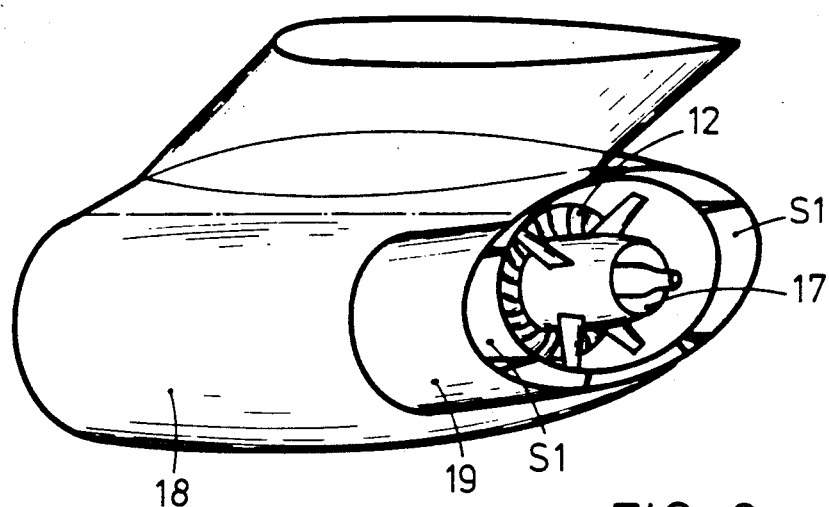
FIG: 3
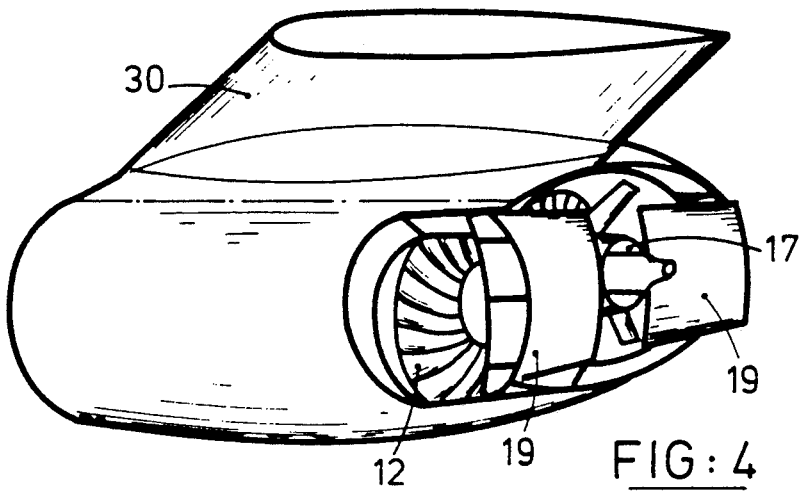
FIG: 4
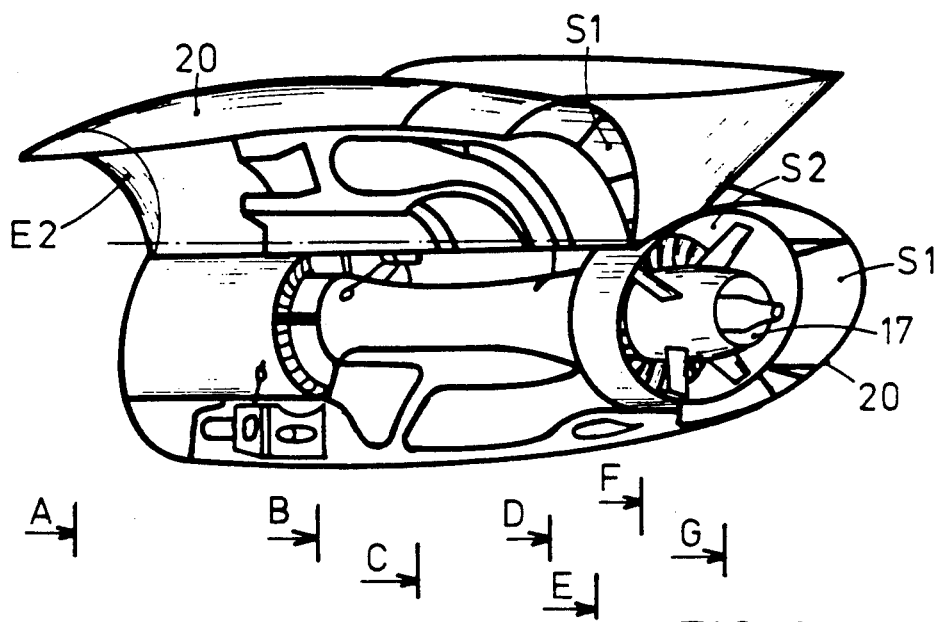
FIG: 5

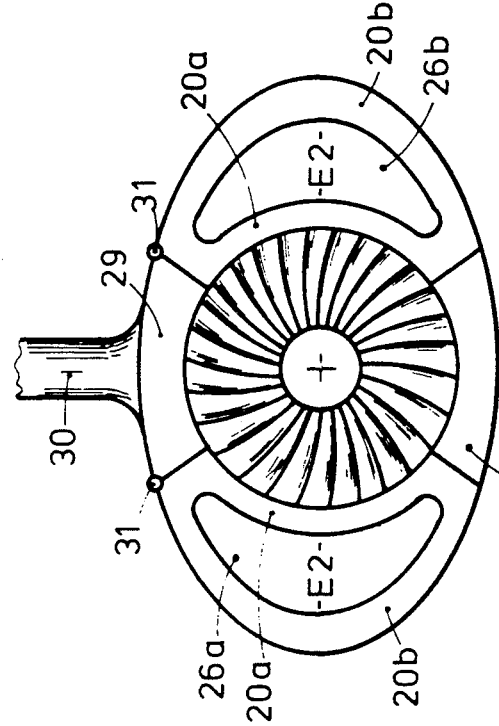
FIG: 6A
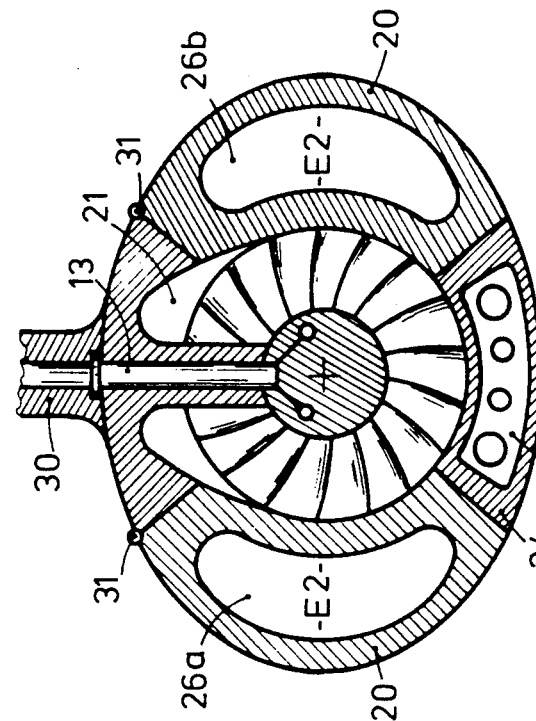
FIG: 6B
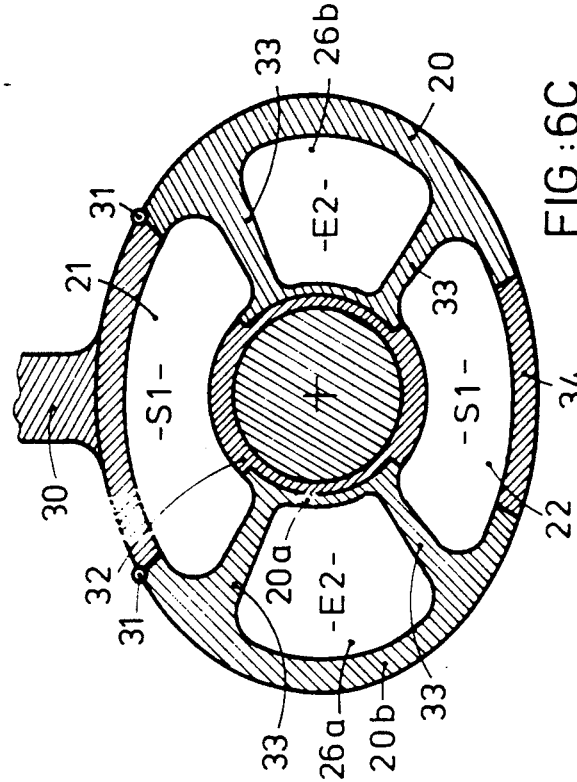
FIG: 6C
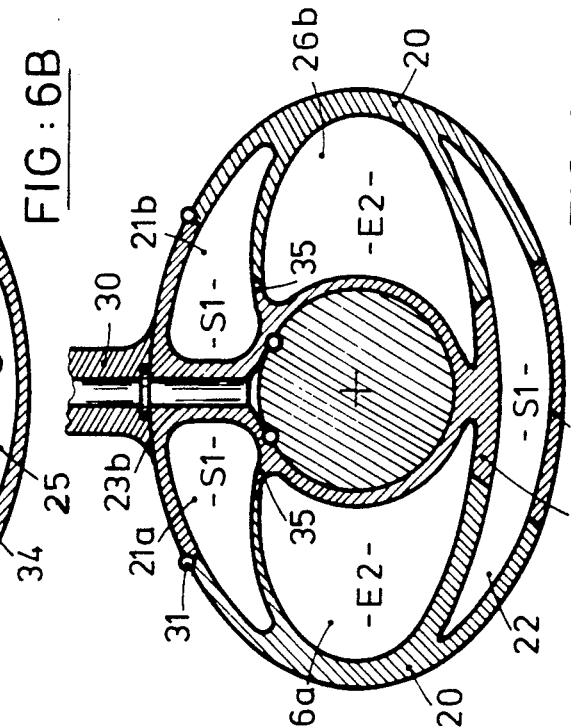
FIG: 6D

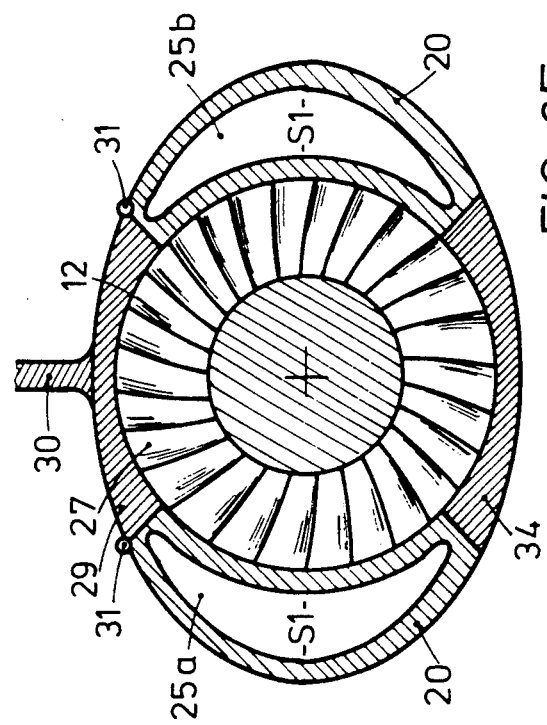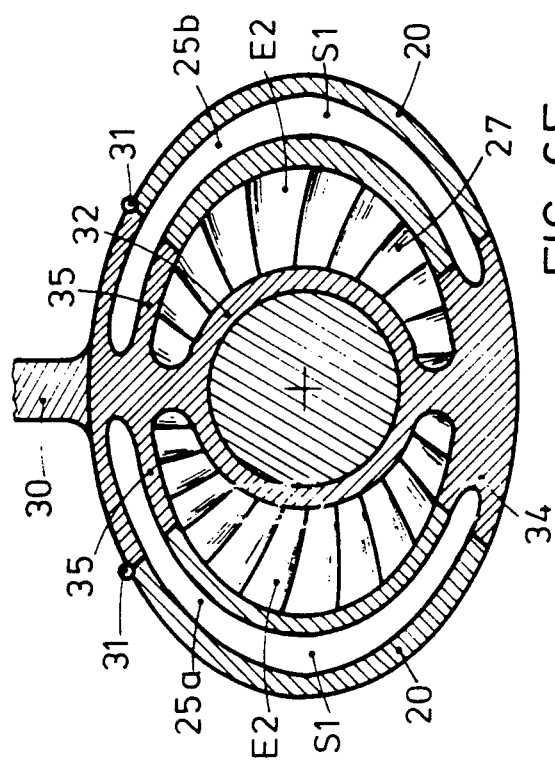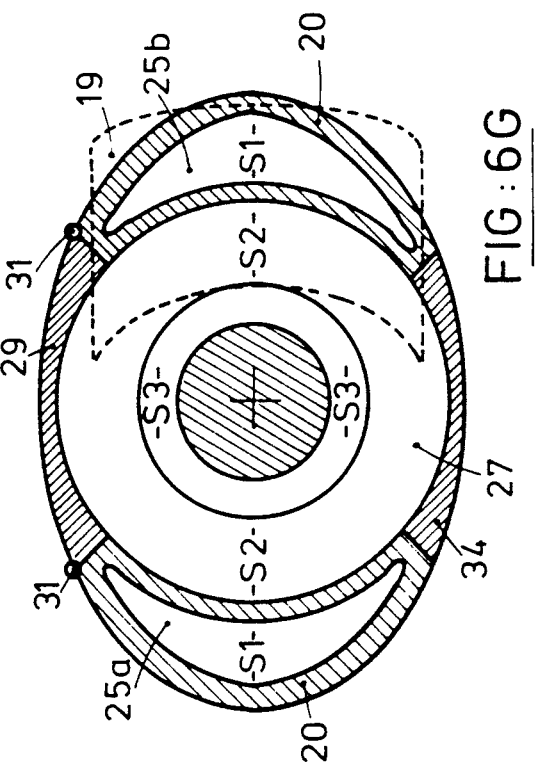

HIGH BY-PASS RATIO TURBOJET ENGINE WITH COUNTERROTATING UPSTREAM AND DOWNSTREAM FANS

BACKGROUND OF THE INVENTION

1. Field of the invention

The present invention relates to a turbojet aero-engine with a high bypass ratio.

2. Description of the Prior Art

It has been common for some years to use bypass turbojet engines for subsonic propulsion, the advantage of mixing the cold and hot air streams being to increase the thrust of the hot engine.

Nevertheless, in practice, one is restricted as to the by-pass ratios which are possible to employ in such engines because of their frontal area and the large cross section which is the corollary of this. Above a bypass ratio of between 8 and 14, the engines become prohibitively large and are effectively prevented from being mounted below the wings of an aircraft.

If it is desired to exceed a bypass ratio of 8, the solution adopted in conventional turbojet engines with an upstream fan, at least up to a bypass ratio of about 11, is to provide the low pressure turbine with between 5 and 8 stages.

For a bypass ratio of from 11 to 14, the conventional solution is no longer convenient (owing to the need for an excesive number of low pressure turbine stages) and it is necessary to use a reduction gear for the front-mounted fan, or a rear-mounted contrarotating fan driven directly by a contrarotating power turbine with interleaved stages.

Above a bypass ratio of 14, one enters the realm of turbo-jet engines with high speed propellers.

These engines are of interest because of the improvement in specific fuel consumption which they provide, but have the disadvantage, because of their large overall diameter, of being capable of installation only at the rear and on either side of the fuselage of the aircraft, or only with highly-integrated and unconventional underwing installations of the type proposed in, for example, French Patent No. 2 622 507.

SUMMARY OF THE INVENTION

It is an object of the present invention to provide a construction which would enable turbojet engines to be made with a bypass ratio of between 8 and 14 while presenting a frontal area very little larger than present day turbojet bypass engines with a bypass ratio of below 6.

It is also an object of the invention to provide such an engine with an increased bypass ratio and thrust without requiring any increase in the total number of stages of blades, which would have an adverse effect on the cost of the engine.

According to the invention there is provided a turbojet engine having a high bypass ratio, said engine including a low pressure unit comprising an upstream fan and a low pressure compressor coupled to said upstream fan, a gas generator comprising a high pressure compressor, a combustion chamber and a high pressure turbine driving said high pressure compressor, a low pressure turbine driven by said gas generator and itself driving said low pressure unit, a rear fan, and a contrarotating turbine interleaved with said low pressure turbine and driving said rear fan.

In a preferred arrangement the upstream fan has a diameter such that the bypass ratio between the cold air flow passing through it and the hot gas flow through the gas generator (i.e. the primary gas flow) is between 6 and 8, whilst the rear fan has a diameter such that the bypass ratio between the cold air flow passing through it and the primary gas flow is between 4 and 6.

In accordance with a further important preferred characteristic of the invention, the engine comprises two imbricated separate flow paths for the cold air. The first cold air flow path passes through the upstream fan and has an air intake in common with the primary airflow to the gas generator, and two crescent shaped outlets are disposed laterally outwardly of the outlet from the rear fan. The second cold air flow path passes through the rear fan and comprises two crescent shaped air intakes disposed laterally outwardly of said intake of said first flow path, and passages leading from said crescent shaped intakes and merging to form an annular passage in which said rear fan is disposed, said annular passage surrounding the hot gas flow from said gas generator and defining an annular outlet from said second flow path.

Preferably the turbojet engine comprises a nacelle having two hinged shells, the passages of said first and second cold air flow paths being formed at least partly within the structure of said nacelle.

This structure enables the nacelle to be given a generally oval shape with a cross section in the form of an ellipse having its major axis horizontal, thus permitting the engine to be mounted beneath the wing of an aircraft having a ground clearance sufficient only for a conventional engine with a much smaller bypass ratio.

The invention thus allows a high bypass ratio turbojet engine to be produced with a low overall size and cross-section which will permit the mounting of the engine beneath the wing of an aircraft.

Other preferred features of the invention will become apparent from the following description, with reference to the drawings, of one embodiment of a turbojet engine in accordance with the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partial longitudinal section of one embodiment of a turbojet engine in accordance with the invention.

FIGS. 2a and 2b show diagrams of the cold air flow paths, the paths being shown separated from each other for the sake of simplicity. FIG. 2a shows the first cold air flow path through the upstream fan of the engine, and FIG. 2b shows the second cold air flow path through the downstream fan.

FIG. 3 is a three quarters rear perspective view of the turbojet engine fitted into its nacelle and suspended from a wing-mounted pylon.

FIG. 4 is a view similar to that of FIG. 3 showing the engine in the reverse thrust position in which the two flaps of the thrust reverser are fully deployed.

FIG. 5 is a similar view to that of FIG. 3 showing one of the nacelle shells hinged upwards to provide access to the engine.

FIGS. 6A to 6G show cross sections through the engine nacelle with its shells closed and taken in planes A to G respectively in FIG. 5.

DESCRIPTION OF THE PREFERRED EMBODIMENT

Figure 7:
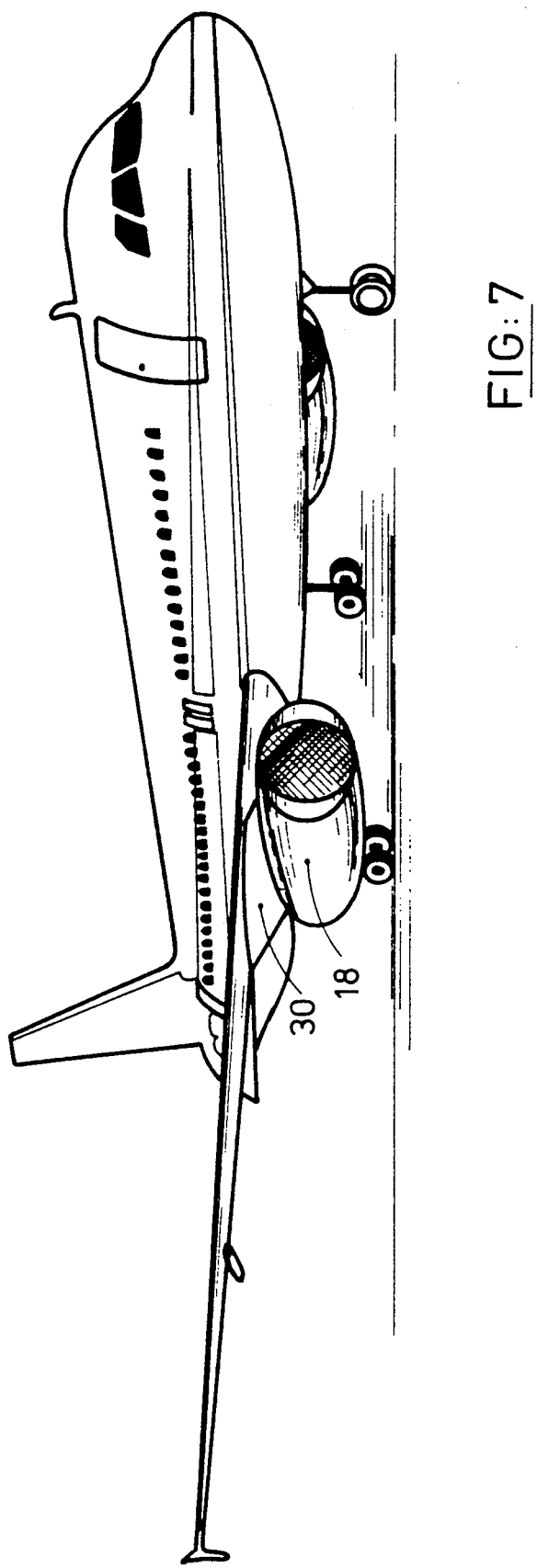
FIG. 7 is a perspective view of an aircraft showing an engine in accordance with the invention mounted under a wing of the aircraft.

With reference to FIG. 1, the engine shown incorporates, in a conventional manner, an upstream fan 1 coupled to a low pressure compressor 2, followed by a high pressure compressor 3, a combustion chamber 4, a single-stage high pressure turbine 5 which drives the high pressure compressor, and a low pressure turbine 6 with four stages which drives the low pressure components 1 and 2.

In accordance with the invention, the engine comprises a downstream contrarotating turbine 7 here represented, by way of example, as having two stages 7a and 7b. However, taking into account the bypass ratios hereinafter stated and the sizing of the upstream and downstream fans, a four-stage turbine will generally be preferred.

The disc 8 of the turbine is carried on a shaft 9 mounted inside the low pressure turbine shaft by means of two bearings 10, and the stages 7a and 7b of the turbine are coupled by means of the outer casing 11 which rotates with them. The assembly carries a rear fan 12 of large diameter generating a bypass ratio of 5 (this value is not limiting), whereas in this example the bypass ratio of the upstream fan is 7 (also a non-limiting value).

The two fans 1 and 12 are therefore "in parallel" and rotate at different speeds.

The engine is suspended from a wing-mounted mast 30 by an upstream pylon 13 fixed to structural members 14 and by a downstream pylon 15 rigid with the engine housing in the region of the housing struts which serve as the flow straighteners 16 for the high Pressure turbine.

In FIG. 1, it is indicated diagrammatically that the two fans are supplied by separate air flow paths. The first flow Path comprises an annular air intake E1 which will be described further below, and an air outlet S1 in the form of two crescents also described below. The second flow path comprises an air intake E2 in the form of two laterally disposed crescents which will be described further below, and an annular air outlet S2 surrounding the hot gas flow 17.

In FIGS. 3 and 4, the engine is shown fitted into a nacelle 18 and is viewed from a three quarters rear position. The nacelle comprises a flow-reversing mechanism 19 with two flaps, which in fact form the exhaust flow nozzle of the first cold air flow path. On pivoting, the flaps intercept the whole flow coming from the upstream fan in the first flow path, and also a part of the flow from the downstream fan in the second flow path, as is also shown in FIG. 6G.

The nacelle is formed with two lateral shells 20 pivotally mounted about longitudinal axes, one on each side of the supporting mast.

FIG. 5 shows the nacelle with one of its lateral shells 20 raised to provide access to the engine. As can be seen from the inside of the raised shell, the cold air flow paths are formed largely within the structure of the shells. Thus, it is the nacelle that ensures the arrangement of the two air flow paths.

The latter are shown diagrammatically in FIGS. 2a and 2b. FIG. 2a shows the first air flow path which includes the upstream fan. The annular air intake E1 is conventional and is common to that for the combustion air flow. Downstream of the fan 1, the flow path splits into two passages, one 21 above the engine and the other 22 beneath the engine. In the upstream part of the passages 21 and 22 there are provided two vertical through-wells 23a and 24 respectively, the well 23a in the passage 21 accommodating the upstream suspension pylon 13 and accessories, and the well 24 in the passage 22 allowing the passage of a bevel gear train to a gearbox 25 disposed in the lower part of the nacelle.

At its downstream end the upper passage 21 splits into two branches 21a and 21b which diverge laterally and join up with the corresponding branches 22a, 22b respectively of the lower passage 22 which also splits at its downstream end into two laterally diverging branches. After the merging of the branches 21a and 22a and the merging of the branches 21b and 22b, each of the passages thus formed has the appearance of a vertical crescent 25a, 25b, and together form the air outlet S1 of the upstream fan.

FIG. 2b shows the second cold air flow path which includes the downstream fan 12. At the upstream end, the air intake E2 is formed by the two vertical crescent shaped passages 26a, 26b, which are initially of constant cross section but then adopt a more necked, petal shape before coming together to form an annular passage 27 which surrounds the hot gas flow and supplies the fan 12. Downstream of the fan 12, the passage 27 retains its annular shape.

In practice, the two air flow paths are imbricated, the crescent shaped inlets E2 of the second flow path lying laterally outwards of the annular inlet E1 of the first flow path, the crescent shaped outlets S1 of the first flow path lying laterally outwards of the annular outlet S2 of the second flow path, and the passages 26a, 26b of the second flow path passing through the spaces 28a, 28b formed between the passages 21, 22 of the first flow path as shown in FIG. 2a.

To achieve such an arrangement, the structure of the nacelle is brought into play, as will be described below with reference to FIGS. 6A to 6G.

The nacelle comprises a structural part including a longitudinal beam 29 fixed to the supporting mast 30 and extending the whole length of the nacelle. The beam 29 comprises two lateral edges carrying longitudinal hinges 31 for pivotally mounting the openable lateral shells 20 of the nacelle as mentioned earlier.

As indicated in FIG. 6A, at the upstream end of the nacelle the two shells 20 are wholly occupied by the passages 26a, 26b defining the crescent shaped intakes E2 of the second bypass air flow path.

At the position of Section B (FIG. 6B) the beam 29 becomes thinner, forming between itself and the engine the beginning of the upper passage 21 of the first air flow path. The lower part of the nacelle is also structural and defines, in the region of Section B, a seating for the gearbox 25.

At the position of Section C (FIG. 6C), the passages 26a, 26b are narrowed so as to become petal-shaped, and the shells 20 have lengthened radial walls 33 connecting the inner wall 20a to the outer wall 20b of the shell. These radial walls 33 separate the passages 26a, 26b from the upper and lower passages 21 and 22 of the first flow path formed respectively between the upper beam 29 and the engine casing 32 and between the casing 32 and the lower structural part 34 of the nacelle.

At the position of Section D (FIG. 6D), the shells 20 no longer possess an inner wall, and the radial walls 33 cooperate with stub walls 35 fixed to the casing 32 to separate the passages 26a,26b from the passages 21 and 22. At this position the upper beam 29 defines a through-well 23b in the channel 21 to accommodate the passage of the rear supporting pylon 15.

At the position of Section E (FIG. 6E), the shells 20 once again have an inner wall 20a, which ensures the separation of the first flow path outlet passages 25a, 25b from the intake passage 27 of the second flow path.

From the position of Section F onwards (FIGS. 6F and 6G), the shells 20 are wholly occupied by the crescent shaped passages 25a, 25b forming the outlet S1 of the first flow path.

In FIG. 6G the dotted lines indicate the position of a flap 19 of the thrust reverser in the deployed position. As can be seen, in the thrust reversal position the whole of the outlet passage S1 of the first flow path (passages 25a and 25b) is closed off, and a part of the passage 27 forming the outlet S2 of the second flow path is also obstructed. Thus, the thrust reverser operates with maximum efficiency by acting on the flow from both fans.

Referring now to FIG. 7, it can be seen that, because of the ovoid form of the nacelle, an engine in accordance with the invention placed under the wing of an aircraft demands a lesser ground clearance for the wing than a conventional circular-section engine with the same by-pass ratio. Alternatively, with the same ground clearance as for conventional engine, one can fit an engine with a higher by-pass ratio provided that it is constructed in accordance with the invention.

Obviously, numerous modifications and variations of the present invention are possible in light of the above teachings. It is therefore to be understood that within the scope of the appended claims, the invention may be practiced otherwise than as specifically described herein.

I claim:

1. A turbojet engine having a bypass ratio, said engine including a low pressure unit comprising:
   an upstream fan,
   a low pressure compressor coupled to said upstream fan,
   a gas generator comprising a high pressure compressor, a combustion chamber and a high pressure turbine driving said high pressure compressor, a low pressure turbine driven by said gas generator and itself driving said low pressure unit, a rear fan, and a counterrotating turbine interleaved with said low pressure turbine and driving said rear fan,
   separate first and second cold air flow paths respectively including said upstream fan and said rear fan, said first cold air flow path having a frontal air intake in common with the air flow to said gas generator, and said second cold air flow path comprising two crescent shaped air intakes disposed laterally outwardly of said intake of said first flow path, and passages leading from said crescent shaped intakes and merging to form an annular passage in which said rear fan is disposed, sad annular passage surrounding the hot gas flow from said gas generator and defining an annular outlet from said second flow path, said first flow path further comprising two crescent shaped outlets disposed laterally outwardly of said annular outlet of said second flow path, and passages leading from said intake of said first flow path to said crescent shaped outlets.

2. A turbojet engine in accordance with claim 1, further including a nacelle comprising two hinged shells, said passages of said first and second cold air flow paths being formed at least partly within the structure of said nacelle.

3. A turbo-jet engine in accordance with claim 2, wherein said nacelle has a generally ovoid shape, the cross section thereof being in the form of an ellipse having its major axis horizontal.

4. A turbojet engine in accordance with claim 2, wherein said engine comprises flow reverser means for reversing the air flow of the first cold air flow path and also part of the air flow of the second cold air flow path.

5. A turbo-jet engine in accordance with claim 4, wherein said thrust reverser is of the flap type.

6. A turbo-jet engine in accordance with claim 5, wherein said thrust reverser comprises two flaps carried one on each of said hinged shells of said nacelle.

7. A turbo-jet engine in accordance with claim 2, wherein said engine is suspended from a mast and comprises front and rear suspension struts and vertical ducts extending through said first and second cold air flow paths and housing said front and rear suspension struts.

8. A turbo-jet engine in accordance with claim 7, wherein said nacelle comprises an upper structural portion fixed to said supporting mast and extending the whole length of said nacelle, said upper structural portion having two lateral edges on which said shells of the nacelle are hinged.

9. A turbojet engine in accordance with claim 8, wherein each of said shells comprises a box-section defining at the front, one of said crescent shaped intakes of said second cold air flow path, said box-section including means for defining, at the level of said high pressure compressor, a petal-shaped passage of said second cold air flow path and radial walls separating said passage from upper and lower passages of said first cold air flow path, said box-section further including means for defining with the structural portion of said nacelle a crescent shaped passage of said first cold air flow path in the region of said rear fan, a passage of said second cold air flow path being defined at this position between the inner wall of the shell and the casing of said engine, and said box-section defining, at the rear, one of said crescent shaped outlets of said first cold air flow path.

* * * * *

UNITED STATES PATENT AND TRADEMARK OFFICE
CERTIFICATE OF CORRECTION

PATENT NO. : 5,058,379
DATED : October 22, 1991
INVENTOR(S) : ALAIN M. J. LARDELLIER It is certified that error appears in the above-identified patent and that said Letters Patent is hereby corrected as shown below:

In the abstract, line 9, delete "ovoide" and insert therefor --ovoid--.

In column 1, line 32, delete "contrarotating" and insert therefor --counterrotating--.

In column 1, line 33, delete "contrarotating" and insert therefor --counterrotating--.

In column 1, line 66, delete "contra-" and insert therefor --counter- --.

In column 3, line 19, delete "contrarotating" and insert therefor --counterrotating--.

In column 6, line 4, delete "sad" and insert therefor --said--.

Signed and Sealed this

Eleventh Day of May, 1993

Attest:

MICHAEL K. KIRK

Attesting Officer

Acting Commissioner of Patents and Trademarks